(12) United States Patent
Koeneman et al.

(10) Patent No.: US 7,269,306 B1
(45) Date of Patent: Sep. 11, 2007

(54) ACTUATOR ARRANGEMENT FOR EXCITATION OF FLEXURAL WAVES ON AN OPTICAL FIBER

(75) Inventors: Paul B. Koeneman, Palm Bay, FL (US); Timothy E. Dimmick, Oviedo, FL (US); Kevin R. Harper, Palm Bay, FL (US); Curtis R. Niemeier, Indialantic, FL (US); Todd E. Deese, Malabar, FL (US); Paul Pilipovich, Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/477,107

(22) Filed: Jun. 28, 2006

(51) Int. Cl.
*G02F 1/335* (2006.01)

(52) U.S. Cl. ............... 385/7; 385/10; 385/15; 385/14; 385/31; 385/39; 385/43

(58) Field of Classification Search ............ 385/7, 385/8, 10, 15, 27, 28, 30, 31, 42, 39, 43, 385/49
See application file for complete search history.

(56) References Cited

U.S. PATENT DOCUMENTS 4,915,468 A * 4/1990 Kim et al. ............. 385/28

(Continued)

OTHER PUBLICATIONS

Kim, et al., All-fiber acousto-optic tunable notch filter with electronically controllable spectral profile, Optic Letters, vol. 22, No. 19, Oct. 1, 1997, pp. 1476-1478.

Engan, H.E., et al., "Propagation and optical interaction of guided acoustic waves in two-mode optical fibers," Journal of Lightwave Technology, vol. 6, No. 3, Mar. 1998, pp. 428-436.

Satorius, D.A., et al., "Double-Pass Acoustoopic Tunable Bandpass Filter With Zero Frequency Shift and Reduced Polarization Sensitivity", IEEE Photonics Technology Letters, vol. 14, No. 9, Sep. 2002, pp. 1324-1326.

Dimmick, Timothy E., et al., "Compact All-Fiber Acoustoopic Tunable Filters with Small Bandwidth-Length Product," IEEE Photonics Technology Letters, vol. 12, O.9, Sep. 2000, pp. 1210-1212.

Berwick, B., et al., "Coaxial optical-fiber frequency shifter," Optics Letters, vol. 17, No. 4, Feb. 15, 1992, pp. 270-272.

Birks, T.A., "Four-port fiber frequency shifter with a null taper coupler," Optics Letters, Vo. 19, No. 23, Dec. 1, 1994, pp. 1964-1966.

*Primary Examiner*—Brian M. Healy
(74) *Attorney, Agent, or Firm*—Sacco & Associates, PA; Robert J. Sacco (57) ABSTRACT

A system for exciting flexural waves on an optical fiber (102) is provided. The system includes a substrate (114, 118), an actuator (106), and a mechanical optical fiber coupling (104). The actuator is formed of an electromechanical transducer material. The actuator is mounted on the substrate. The mechanical optical fiber coupling (for example, an adhesive media) forms a secure mechanical connection between the actuator and the optical fiber. The mechanical optical fiber coupling is configured for communicating mechanical vibrations from the actuator to the optical fiber. However, it should be understood that the mechanical optical fiber coupling is exclusive of a tapered horn.

33 Claims, 5 Drawing Sheets

U.S. PATENT DOCUMENTS

| | | | |
|---|---|---|---|
| 4,928,030 A | 5/1990 | Culp | 310/328 |
| 5,022,732 A | 6/1991 | Engan et al. | 385/10 X |
| 5,043,621 A | 8/1991 | Culp | 310/316 |
| 5,268,611 A | 12/1993 | Culp | 310/328 |
| 5,708,736 A * | 1/1998 | Steinblatt | 385/28 |
| 5,915,050 A | 6/1999 | Russell et al. | 385/7 |
| 5,939,816 A | 8/1999 | Culp | 310/328 |
| 6,021,237 A | 2/2000 | Kim et al. | 385/28 |
| 6,359,370 B1 | 3/2002 | Chang | 310/328 |
| 6,640,027 B2 * | 10/2003 | Kim et al. | 385/28 |
| 6,771,848 B2 | 8/2004 | Yamanaka et al. | 385/16 |
| 6,952,074 B2 | 10/2005 | Nagaura | 310/361 |
| 6,954,117 B2 | 10/2005 | Komuro et al. | 333/133 |
| 6,956,317 B2 | 10/2005 | Namerikawa et al. | 310/331 |
| 6,960,028 B2 | 11/2005 | Lampert | 385/81 |
| 6,969,945 B2 | 11/2005 | Namba et al. | 310/340 |

* cited by examiner

ACTUATOR ARRANGEMENT FOR EXCITATION OF FLEXURAL WAVES ON AN OPTICAL FIBER

STATEMENT REGARDING FEDERALLY SPONSORED RESEARCH OR DEVELOPMENT

This invention was made with government support. The government has certain rights in the invention as specified in FAR 52.227-12.

BACKGROUND OF THE INVENTION

1. Statement of the Technical Field

The invention concerns acousto-optic devices, and more particularly, acousto-optic devices having an actuator for exciting flexural waves on an optical fiber.

2. Description of the Related Art

There are many types of fiber-optic devices known in the art which employ acoustic flexural waves. Such devices include optical switches, acousto-optic bandpass filters, acousto-optic bandstop filters, tunable optical fiber couplers, fiber-optic frequency shifters, and fiber-optic polarization analyzers. These devices typically employ acoustic flexural waves to couple light between modes of an optical fiber. A fiber-optic device's operation is often adjusted by tuning the flexural wave frequency over a large frequency range.

U.S. Pat. No. 6,021,237 to Kim et al. describes an all-fiber acousto-optic tunable filter. The acousto-optic tunable filter requires the generation of an acoustic wave and the coupling of the acoustic wave to a flexural wave on an optical fiber. This is accomplished with the use of a piezoelectric actuator and a horn that is coaxial with the optical fiber. The piezoelectric actuator produces an acoustic vibration when an electrical signal having pre-selected frequency component is applied thereon. The horn is placed between a piezoelectric actuator and the optical fiber. In this regard, the horn transmits the acoustic vibration (or an amplified variation thereof) to the optical fiber. In effect, an acoustic wave propagates along a portion of the optical fiber.

In the foregoing systems, the horn which is interposed between the piezoelectric actuator and the optical fiber performs certain functions. In particular, the horn guides a generated flexural acoustic wave toward its propagating direction. The horn also increases the amplitude of the flexural acoustic wave by concentrating the generated flexural acoustic wave at a predetermined location, which is usually the tip of the horn.

Despite the advantages of the foregoing arrangement, it suffers from certain drawbacks. For example, the fiber-optic device is designed to operate at a defined input signal frequency. As such, mechanical resonance frequencies of the horn structure produce a wide swing in the actuator's piezo efficiency as a function of an excitation frequency (i.e., an electrical signal's frequency that is applied to the actuator for inducing a particular piezoelectric effect). As a result, a continuous tuning of the excitation frequency with the fiber-optic device's acoustic or optical response has been difficult to achieve. Also, the piezoelectric actuator is affected by its temperature variations such that its performance characteristics become unstable and/or unpredictable. Further, the actuator's size and the horn's size are typically much larger than the cross-sectional size of the optical fiber. In this regard, the miniaturization of the fiber-optic device has been limited by the actuator-horn configuration.

In view of the forgoing, an acousto-optic device is needed that is designed to operate over a range of input signal frequencies. The acousto-optic device needs to provide for continuous tuning of the piezoelectric actuator's excitation frequency with the fiber-optic device's acoustic or optical response. An acousto-optic device is also needed with stable and predictable performance characteristics over a wide temperature range. Furthermore, an acousto-optic device is needed that can be miniaturized.

SUMMARY OF THE INVENTION

A system for exciting flexural waves on an optical fiber is provided. The system is comprised of a substrate, an actuator, and a mechanical optical fiber coupling. The actuator is formed of an electromechanical transducer material, such as a piezoelectric material, an electrostrictive material, and a magnetostrictive material. The actuator is mounted on the substrate. The mechanical optical fiber coupling (for example, an adhesive media) forms a secure mechanical connection between the actuator and one or more optical fibers. The mechanical optical fiber coupling is configured for communicating mechanical vibrations from the actuator to the optical fiber. However, it should be understood that the mechanical optical fiber coupling is exclusive of a tapered horn.

According to an aspect of the invention, the actuator has a first end face secured to the substrate. The actuator is also comprised of a second end face secured to the optical fiber. One or more electrical conductors are provided that form an electrical connection with the first and second end faces of the transducer material. The electrical conductors are used to excite the transducer material with an energetic stimulus. For example the energetic stimulus can be an electrical signal at desired frequency.

The system also comprises a bonding medium disposed between the actuator and the substrate. The bonding medium can be a solder or an adhesive material. If a solder is used, the solder transmits the vibration produced by the actuator into the substrate. If an adhesive material is used, an electrically conductive adhesive material, an energy absorbing material, and/or an energy reflecting material can be selected for this purpose. If an energy reflecting material is used, it advantageously is formed of a soft material that has a sufficiently different mechanical impedance relative to the actuator so that acoustic energy does not propagate through the material and into the substrate. The energy absorbing or reflecting material is configured for isolating the substrate from a vibration produced by the actuator. The energy reflecting material is configured as a soft material having a sufficiently different impedance than the transducer material so that an acoustic energy will not propagate through the energy reflecting material into the substrate.

If a solder is used as the bonding medium, the system further comprises a damping material, such as a tungsten-filled epoxy. The damping material reduces the movement of the substrate at its natural frequencies of vibration. According to an embodiment of the invention, the damping material is incorporated into at least a portion of the substrate as part of a multilayer substrate or embedded within at least a portion of the substrate. According to another embodiment of the invention, the damping material is disposed on the substrate such that it surrounds a periphery of the actuator as a minimum. According to yet another embodiment of the invention, the damping material is disposed on the substrate such that it is in contact with one or more surfaces of the actuator.

According to another aspect of the invention, mechanical resonant frequencies of the actuator are exclusive of a predetermined range of frequencies of the flexural waves the system is designed to excite. The actuator therefore operates over a band of frequencies which is typically between one or more relatively low frequency mechanical resonances of the actuator, or below the lowest frequency mechanical resonances of the actuator. According to yet another aspect of the invention, at least one mechanical resonant frequency of the actuator is at least one octave different in frequency than the predetermined range of frequencies of the flexural waves. According to another aspect of the invention, the actuator has a mechanical resonant frequency equal to a predetermined frequency of the flexural waves the system is designed to excite.

The invention also includes a method for exciting flexural waves on an optical fiber. The method includes generating a mechanical vibration with an actuator mounted on a substrate by exciting an electromechanical transducer material. The electromechanical transducer material is selected from the group consisting of a piezoelectric material, an electrostrictive material, and a magnetostrictive material. The method also includes forming a flexural wave on an optical fiber by communicating the mechanical vibration to the optical fiber through a mechanical optical fiber coupling (for example, an adhesive medium) that is exclusive of a tapered horn.

According to an aspect of the invention, the method includes securing a first end face of the actuator to a substrate. An electrically conductive adhesive, an energy absorbing material, and/or an energy reflecting material can be used for this purpose. The energy absorbing material is configured for isolating the substrate from a vibration produced by the actuator. The energy reflecting material is configured as a soft material having a sufficiently different impedance than the transducer material so that an acoustic energy will not propagate through the energy reflecting material into the substrate. The second end face of the actuator is secured to the optical fiber. An adhesive material can be used for this purpose.

An electrical connection is formed with each of the first and second end faces of the transducer material. For example, the first end face is coupled to a first conductive trace disposed on the substrate with solder. The second end face is coupled to second conductive trace disposed on the substrate with a wire bond. The first and second conductive traces are electrically coupled to an external source. For example, an AC signal source can be used for this purpose. The AC signal source is used to generate an excitation signal for exciting the transducer material at a particular frequency. A mechanical vibration of the transducer material is communicated to one or more optical fibers.

If a stiff material (such as solder) is used to form an electrical connection between the first end face of the actuator and the first conductive trace, the method further includes positioning a damping material (for example, a tungsten-filled epoxy) on the substrate. According to an embodiment of the invention, the damping material is incorporated into the substrate as part of a multilayer substrate or embedded within at least a portion of the substrate. According to another embodiment of the invention, the damping material is disposed on the substrate such that it surrounds a periphery of the actuator as a minimum. According to yet another embodiment of the invention, the damping material is disposed on the substrate such that it is in contact with one or more surfaces of the actuator.

According to another aspect of the invention, the method includes selecting mechanical resonant frequencies of the actuator to be exclusive of a predetermined range of frequencies of the flexural waves the system is designed to excite. It should be appreciated that this step involves choosing a size and a shape of the actuator to provide mechanical resonant frequencies exclusive of a predetermined range of frequencies of the flexural waves the system is designed to excite. The actuator therefore operates over a band of frequencies which is typically between one or more relatively low frequency mechanical resonances of the actuator, or below the lowest frequency mechanical resonances of the actuator. According to yet another aspect of the invention, the method includes selecting at least one relatively low, or the lowest, mechanical resonant frequency of the actuator to be at least one octave higher in frequency than the predetermined range of frequencies of the flexural waves. According to another aspect of the invention, the method includes selecting a mechanical resonant frequency of the actuator equal to a predetermined frequency of flexural waves the system is designed to excite.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1:
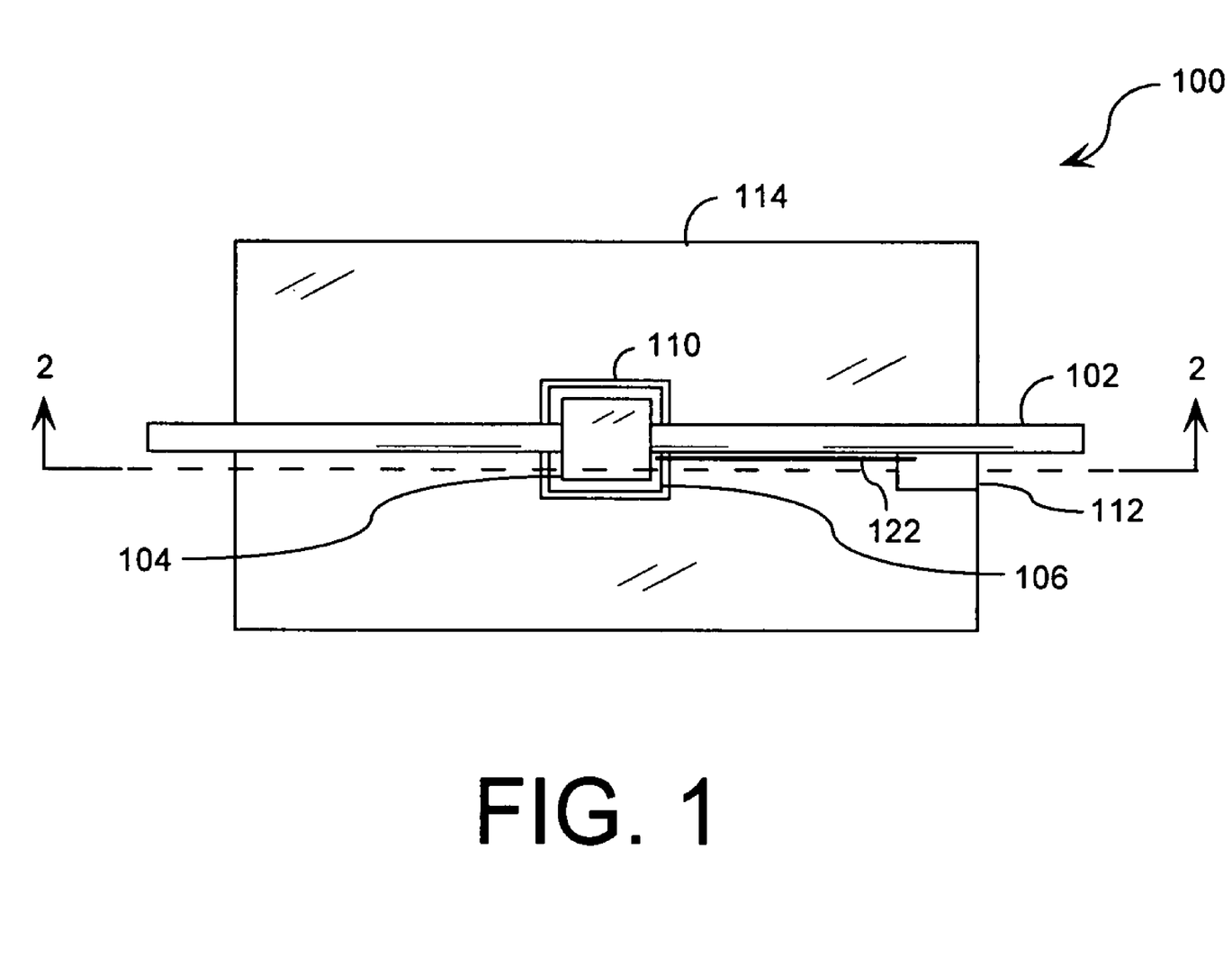
FIG. 1 is a top view of a fiber optic device that is useful for understanding the invention.
Figure 2:
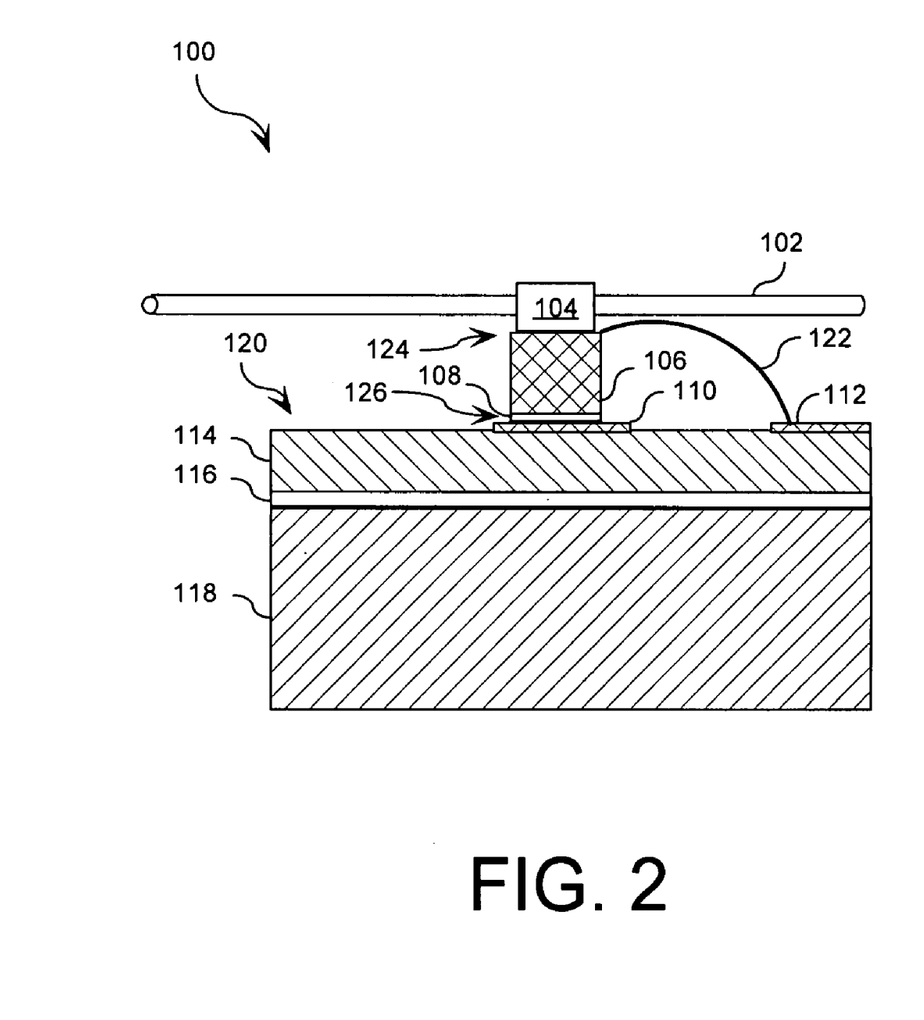
FIG. 2 is a cross sectional view showing the fiber optic device of FIG. 1 taken along line 2-2.

FIG. 1 is a top view of a fiber optic device 100. FIG. 2 is a cross-sectional view of fiber-optic device 100 taken along line 2-2 of FIG. 1. Fiber-optic device 100 is comprised of an optical fiber 102, a mechanical optical fiber coupling 104, an actuator 106, a bonding medium 108, and a substrate 120. Optical fiber 102 is comprised of a glass optical fiber, a plastic optical fiber, and/or a quartz optical fiber. Glass optical fibers can be formed of silica glass, fluorozirconate glass, fluoroaluminate glass, chalcogenide glass, and/or any other suitable glass known in the art. Plastic optical fibers can be formed of a transparent plastic material, such as a polymethylmeth-acrylate (PMMA) polymer. It should be appreciated that optical fiber 102 is selected in accordance with a particular fiber-optic device 100 application. For example, different types of optical fiber can be used in a bandpass filter application a bandstop filter application, a variable coupler application, and/or a wavelength selective switch application. It should be understood that optical fiber 102 is described herein as a single optical fiber. However, the invention is not limited in this regard. Optical fiber 102 can actually be comprised of a plurality of optical fibers arranged as an array of fibers. Optical fibers are well known to persons skilled in the art. Thus, optical fibers will not be described in great detail herein.

At least one optical fiber 102 is mechanically secured to the actuator 106 with the mechanical optical fiber coupling 104. The mechanical optical fiber coupling 104 is comprised of any suitable material capable of performing this function. According to a preferred embodiment, an adhesive media is used for securing the optical fiber 102 to the actuator. Such adhesive medias include a natural adhesive, a synthetic adhesive, and/or any other adhesive commonly used in the art. Synthetic adhesives include an epoxy based adhesive, a polyester based adhesive, and/or a urethane based adhesive. Still, those skilled in the art will appreciate that the mechanical optical fiber coupling can have various alternative arrangements. For example, a miniature mechanical latching structure could be used to securely lock the optical fiber in position on the actuator 106. The mechanical optical fiber coupling 104 is configured for communicating mechanical vibrations from actuator 106 to optical fiber 102. However, it should be understood that the mechanical optical fiber coupling 104 is configured so as to avoid the use of a horn or a horn-like structure. As explained in more detail below, the need for such conventional horn structures is advantageously avoided by selectively controlling the mechanical impedance of the actuator 106.

Actuator 106 is a device for generating flexural waves in optical fiber 102. For example, actuator 106 is comprised of a material that produces a mechanical vibration when subjected to an applied radio frequency (RF) signal. The mechanical vibration is transmitted to optical fiber 102 through the mechanical optical fiber coupling 104. As a result, a flexural wave will propagate along a longitudinal axis of optical fiber 102. It should be appreciated that actuator 106 is also capable of converting mechanical vibrations into an electrical signal.

According to an aspect of the invention, actuator 106 is formed of any electromechanical material. As used herein, the term electromechanical material refers to any material that can generate a mechanical vibration, flexing or oscillation in response to an energetic stimulus. Examples of such energetic stimulus include, without limitation, applied electric and magnetic fields. For example, a piezoelectric material is an electromechanical material that can be used to form the actuator 106. A piezoelectric material will transform an applied AC electrical signal into a mechanical vibration as described herein. In this regard, actuator 106 can be comprised of a piezoelectric material, such as lead-zirconate-titanate (PZT), lead-titanate (PbTiO$_2$), and/or barium-titanate (BaTiO$_3$). Actuator 106 can also be comprised of an electrostrictive material, such as lead magnesium niobate titanate (PMN-PT) and/or lead nickel niobate titanate (PNN-PT). Actuator 106 can further be comprised of a magnetostrictive material, for example Terfenol-D® manufactured by ETREMA Product, Inc. of Ames, Ind.

The sizing of actuator 106 is selected in accordance with a particular fiber-optic device 100 application. For example, the actuator 106 can be comprised of an electromechanical transducer material with a physical size and geometric design to provide mechanical resonant frequencies exclusive of a predetermined range of flexural wave frequencies fiber-optic device 100 is designed to excite. The actuator therefore can operate in a gap or frequency band which is exclusive of one or more relatively low frequency mechanical resonances of the actuator, or below the lowest frequency mechanical resonances of the actuator.

According to one embodiment, actuator 106 can be comprised of an electromechanical transducer material with a size and geometric design selected to provide a mechanical resonant mode at a frequency at least one octave higher in frequency than the predetermined range of flexural wave frequencies fiber-optic device 100 is designed to excite. According to an alternative aspect of the invention, actuator 106 can further be comprised of an electromechanical transducer material having a mechanical resonant frequency approximately equal to the predetermined frequency of flexural waves fiber-optic device 100 is designed to excite.

It should be understood that the size of actuator 106 can be determined using a finite element modeling program. For example, the mechanical impedance of an electromechanical transducer material is a function of structural parameters and mechanical properties. Such structural parameters include the transducer material's mass, stiffness, length, width, and height. Such mechanical properties include the materials displacement in response to an applied radio frequency voltage. Similarly, the mechanical impedance of optical fiber 102 is a function of structural parameters and mechanical properties. A finite element modeling program can calculate a theoretical mechanical impedance of actuator 106 and optical fiber 102 using the identified parameters. Consequently, fiber-optic device 100 can be designed for optimal electromechanical efficiency. Finite element modeling programs are well known to persons skilled in the art. Thus, such programs will not be described in great detail herein. However, it will be understood that the various structural parameters and mechanical properties of an actuator which is modeled can be selectively varied until a desired mechanical resonant frequency and mechanical impedance is achieved.

Referring to FIGS. 1 and 2, actuator 106 is mounted on substrate 120 using any suitable bonding medium 108. Such bonding mediums include a rigid boding medium, a soft bonding medium, an energy absorbing material, and/or an energy reflecting material. Rigid bonding mediums include fusible soldering alloys, such as a tin-lead solder alloy, tin-silver solder alloy, tin-silver-copper solder alloy, and/or any other suitably conductive alloy known in the art. Soft bonding mediums include adhesives. For example, electrically conductive adhesives can be used for this purpose. Electrically conductive adhesives are well known in the art and can include an electrically conductive silicone adhesive, an electrically conductive urethane adhesive, a silver based adhesive, a nickel based adhesive, and/or a gold based adhesive. A person skilled in the art will appreciate that a bonding medium can be made from an energy absorbing material or an energy reflecting material. The energy absorbing material can be advantageously configured to isolate actuator 106 vibrations from substrate 120. The energy absorbing material includes any bonding medium known in the art that is configured for isolating the substrate from vibrations produced by actuator 106. The energy absorbing material is advantageously selected to provide a good mechanical impedance match between itself and the actuator so that the vibration energy transmits downwardly into the energy absorbing material and dissipates as heat. The energy reflecting material can be configured as a material having a sufficiently different impedance as compared to the actuator material so that an acoustic energy will not propagate through the energy reflecting material into the substrate. The energy reflecting material is advantageously selected to provide a poor mechanical impedance match between the actuator and the substrate so that the vibration energy does not transmit downwardly into the substrate and vibration energy from the substrate does not transmit upwardly into the actuator.

Substrate 120 is comprised of one or more layers of materials suitable for providing a mechanical support for the actuator 106. According to an embodiment of the invention shown in FIG. 2, the substrate 120 is comprised of a first layer 114 and a second layer 118. First layer 114 is comprised of a non-conducting substrate. Such non-conducting substrates include an alumina ceramic, a zirconia ceramic, a zirconia toughened alumina ceramic, and/or any other suitable non-conducting substrate. According to an aspect of the invention, first layer 114 is advantageously selected to include an acoustic impedance matching an acoustic impedance of the transducer material of actuator 106. It should be appreciated that an acoustic impedance mismatch between first layer 114 and actuator 106 can affect the transducer material's response to actuation frequencies. For example, if an acoustic impedance mismatch exists between first layer 114 and actuator 106, acoustic reflections can occur at an interface between first layer 114 and actuator 106.

According to an embodiment of the invention, first layer 114 advantageously has one or more conductive traces 110, 112 disposed thereon. Conductive traces 110, 112 are made of a conductive material, such as gold, copper, and/or nickel. Each conductive trace 110, 112 can provide a connection means between actuator 106 and an external system, such as a power source. Conductive traces 110, 112 can be formed by any method commonly used in the art, such as a physical etching method or a sputter etching method.

As shown in FIGS. 1 and 2, conductive trace 110 is coupled to a first end face 126 of actuator 106 using bonding medium 108, described above. In this regard an electrical connection is formed between conductive trace 110 and first end face 126. Additionally, a lead wire 122 is provided for forming an electrical connection between conductive trace 112 and second end face 124. In this regard, lead wire 122 is electrically coupled to conductive trace 112 and actuator 106 using any suitable conducive bonding medium, such as solder, an electrically conductive adhesive, and/or a wire bond. Although not shown, it should be appreciated that each conductive trace 110, 112 is electrically coupled to an external device (for example, a power source) such that a radio frequency signal can be applied to actuator 106. Typical examples of frequency ranges for applied radio frequency signals include one hundred kilohertz (100 kHz) to ten megahertz (10 MHz). The magnitude of the applied signal will depend on a variety of factors in addition to the actuator material properties. Such factors can include how a power supply is electrically impedance matched to actuator 106, an electrical resistance of a driving circuit, how well actuator 106 is mechanically impedance matched to optical fiber 102, an amplitude of the flexural wave in the optical fiber 102 required for the application, a diameter of optical fiber 102 (or diameters of optical fibers for a multi-fiber device), and a stiffness of optical fiber 102 (or optical fibers for a multi-fiber device).

According to an embodiment of the invention, the magnitude of the input signal will be a half of a volt (0.5 V) to fifteen volts (15 V). However, it should be understood that such a magnitude is in accordance with an embodiment having an actuator 106 formed of a PZT based compound. In this regard, the magnitude of the input signal can change with the type of electromechanical material used to form the actuator 106.

Lead wire 122 can be formed of gold, tin, copper, nickel, and/or any suitably conductive material known in the art. However, a person skilled in the art will appreciate that a particular fiber-optic device 100 application can dictate the specifications of lead wire 122 (i.e., lead wire 122 diameter, insulation material, and wire material). Lead wire 122 is described herein as a single lead wire. Still, the invention is not limited in this regard. Lead wire 122 can actually be comprised of a plurality of lead wires. Lead wires are well known to persons skilled in the art. Thus, lead wires will not be described in great detail herein.

According to an embodiment of the invention, the substrate 120 has a second layer 118 comprised of a material having a thermal expansion coefficient that matches the thermal expansion coefficient of the optical fiber. Such materials include fused silica ($SiO_2$) and/or fused quartz. Second layer 118 is coupled to first layer 114 using a bonding medium 116. It should be appreciated that the first layer 114 can be entirely embedded in the bonding medium 116 such that the bonding medium 116 covers the sides of the first layer 114. Any suitable bonding medium can be used for this purpose. In the embodiment shown, bonding medium 116 is comprised of a tungsten-filled epoxy and/or any other suitable epoxy. According to one aspect of the invention, bonding medium 116 is advantageously selected with an acoustic impedance matching an acoustic impedance of the adjacent materials 114 and 118. A person skilled in the art will appreciate that a thickness of bonding medium 116 can be designed for optimal impedance matching with first layer 114, second layer 118, and/or actuator 106. According to another aspect of the invention, bonding medium 116 is advantageously selected to include a high mechanical damping characteristic and/or a high impedance characteristic.

A person skilled in the art will appreciate that fiber-optic device 100 architecture is one embodiment of an actuator architecture. However, the invention is not limited in this regard and any other architecture can be used without limitation. For example, substrate 120 can include a single layer selected from a group consisting of first layer 114 and second layer 118, described above. In such a scenario, the fiber-optic device 100 architecture can be adjusted accordingly.

Figure 3:
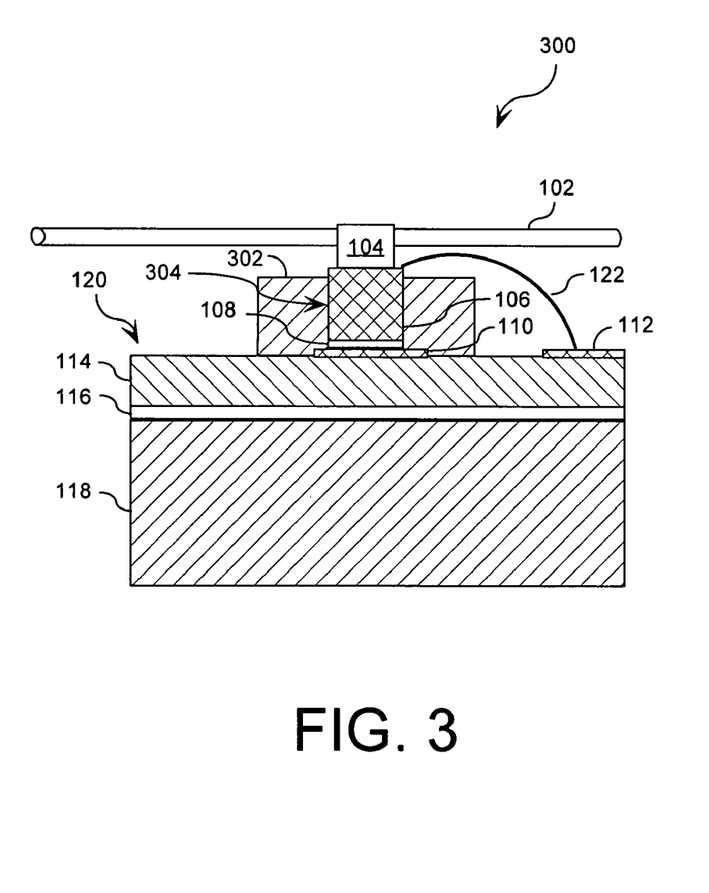
FIG. 3 is a cross sectional view showing a second embodiment of a fiber optic device that is useful for understanding the invention.

FIG. 3 is a cross sectional view showing a second embodiment of a fiber-optic device that is useful for understanding the invention. Fiber-optic device 300 is comprised of an optical fiber 102, a mechanical optical fiber coupling 104, an actuator 106, a bonding medium 108, and a substrate 120, as previously described. It should be appreciated that the description above will suffice with respect to the similar components.

Referring again to FIG. 3, fiber-optic device 300 is further comprised of a damping material 302. Damping material 302 reduces the movement of substrate 120 at structural resonance frequencies (i.e., substrate's 120 natural frequency of vibration). Damping material 302 also contributes to the stabilization of the actuator's 106 response over a wide range of resonant frequencies.

Damping material 302 is comprised of any suitable energy absorbing material. According to an embodiment of the invention, the damping material is a tungsten-filled epoxy and/or any other suitable epoxy. According to an aspect of the invention, damping material 302 is advantageously selected with a mechanical impedance matching the mechanical impedance of the transducer material of actuator 106. According to another aspect of the invention, damping material 302 is advantageously selected to include a high mechanical damping characteristic and/or a high impedance characteristic. It should be appreciated that damping material 302 can have dimensions (i.e., a thickness, a length, and a width) for providing optimal damping of substrate's 120 movements.

As shown in FIG. 3, damping material 302 is disposed on substrate 120. Damping material 302 is applied to substrate 120 such that damping material 302 is in contact with at least a portion of an outer surface 304 of actuator 106. However, it should be appreciated that the invention is not limited in this regard. For example, the damping material 302 can be incorporated into at least a portion of the substrate 120 as part of a multilayer substrate or can be embedded within at least a portion of the substrate 120.

A person skilled in the art will appreciate that fiber-optic device 300 architecture is one embodiment of a fiber-optic device architecture. However, the invention is not limited in this regard and any other fiber-optic device architecture can be used without limitation. For example, substrate 120 includes a single layer selected from a group consisting of first layer 114 and second layer 118, described above (in relation to FIGS. 1 and 2). In such a scenario, the fiber-optic device 300 architecture can be adjusted accordingly.

Figure 4:
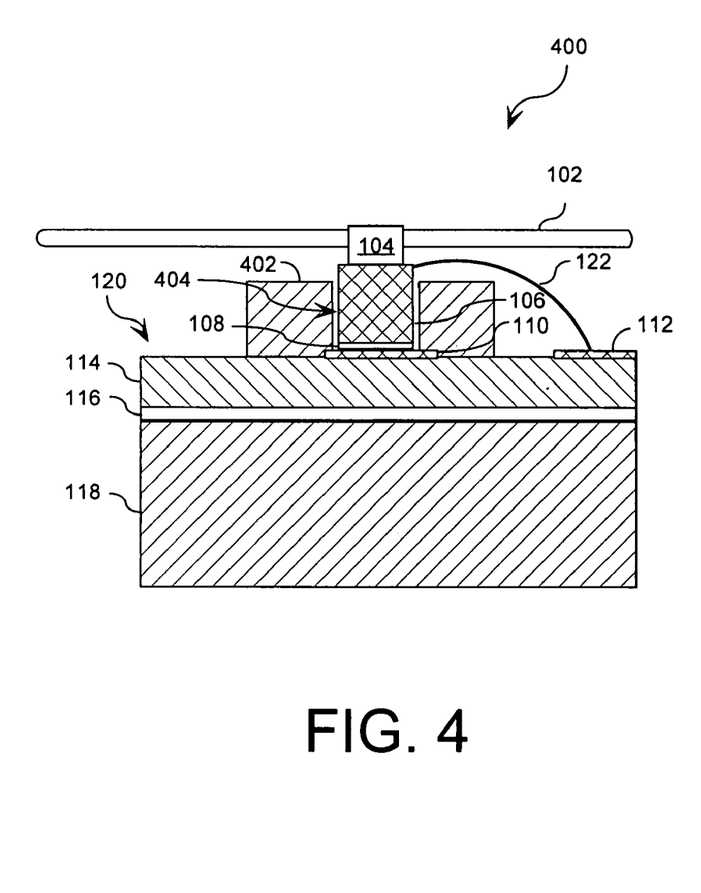
FIG. 4 is a cross sectional view showing a third embodiment of a fiber optic device that is useful for understanding the invention.

FIG. 4 is a cross sectional view showing a third embodiment of a fiber-optic device that is useful for understanding the invention. Fiber-optic device 400 is comprised of an optical fiber 102, a mechanical optical fiber coupling 104, an actuator 106, a bonding medium 108, and a substrate 120, as previously described (in relation to FIGS. 1 and 2). It should be understood that the description above will suffice with respect to the similar components.

Referring now to FIG. 4, fiber-optic device 400 is further comprised of a damping material 402. Damping material 402 reduces the movement of substrate 120 at structural resonance frequencies. Damping material 402 also contributes to the stabilization of the actuator's 106 response over a wide range of resonant frequencies.

Damping material 402 is comprised of a tungsten-filled epoxy and/or any other suitable epoxy. According to an aspect of the invention, damping material 402 is advantageously selected with an acoustic impedance matching an acoustic impedance of the transducer material of actuator 106. According to another aspect of the invention, damping material 402 is advantageously selected to include a high mechanical damping characteristic and/or a high impedance characteristic. It should be appreciated that damping material 402 can have dimensions (i.e., a thickness, a length, and a width) for providing optimal damping of substrate's 120 movements.

As shown in FIG. 4, damping material 402 is disposed on substrate 120. Damping material 402 is applied to substrate 120 such that damping material 402 surrounds a periphery of actuator 106 without coming into contact with the actuator's 106 outer surface 404. However, it should be appreciated that the invention is not limited in this regard. For example, the damping material 402 can be incorporated into at least a portion of the substrate 120 as part of a multilayer substrate or can be embedded within at least a portion of the substrate 120.

A person skilled in the art will appreciate that fiber-optic device 400 architecture is one embodiment of a fiber-optic device architecture. However, the invention is not limited in this regard and any other fiber-optic device architecture can be used without limitation. For example, substrate 120 includes a single layer selected from a group consisting of first layer 114 and second layer 118, described above (in relation to FIGS. 1 and 2). In such a scenario, the fiber-optic device 400 architecture can be adjusted accordingly.

Figure 5:
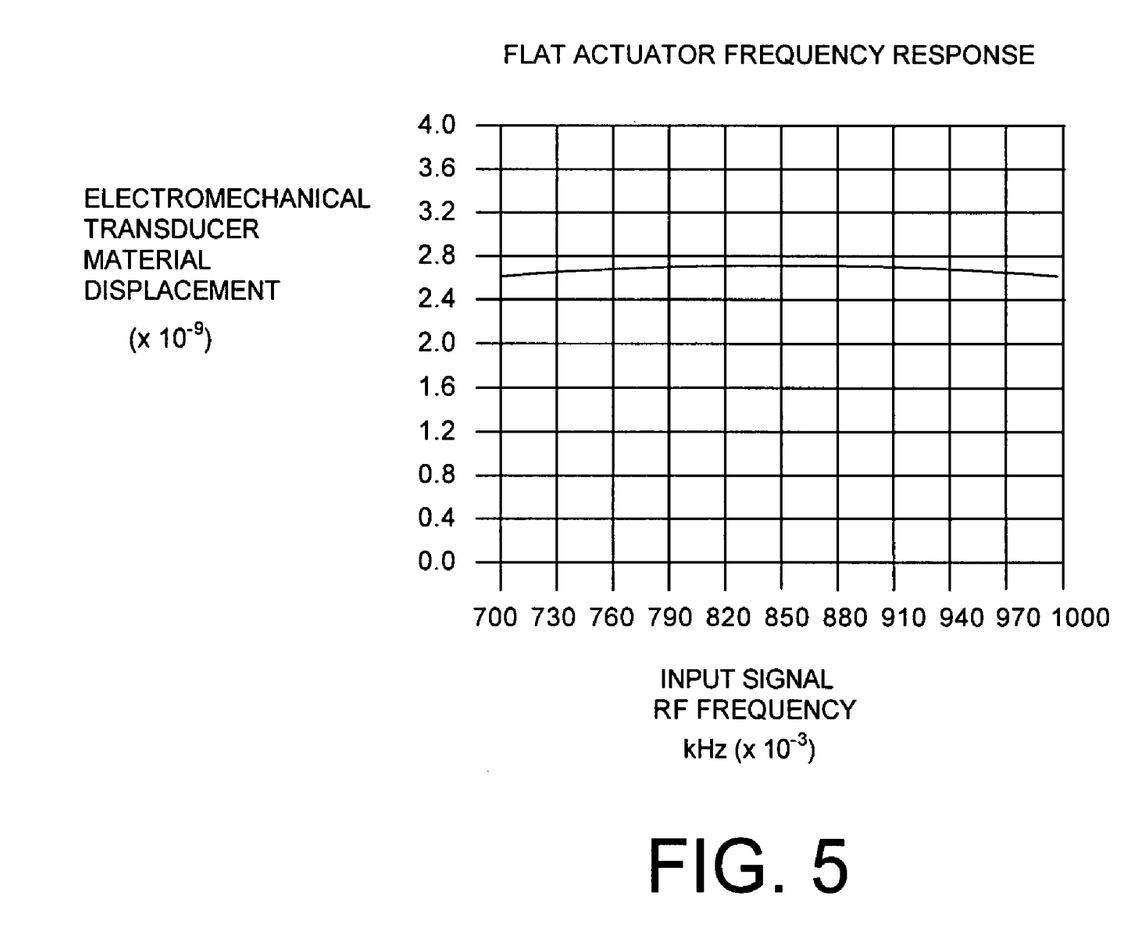
FIG. 5 is a graph showing a flat actuator response that is useful for understanding the invention.

Referring now to FIG. 5, a graph is provided showing a flat actuator 106 response that is useful for understanding the invention. The graph plots an electromechanical transducer material's displacement versus an applied signal's radio frequency. As illustrated in FIG. 5, the transducer material's displacement substantially remains unchanged when an applied signal's radio frequency is varied from 700 kHz to 1000 kHz with the drive amplitude held constant. Such a flat response can be highly desirable in certain applications. The flat response is achieved by designing the resonant frequencies of the actuator 106 to be above and/or below the excitation frequency range over which the actuator is designed to operate, the frequency of the mechanical vibration the actuator is designed to produce, and the frequency of the flexural waves that are to be impressed upon the optical fiber. By selecting the resonant frequencies in this way, a relatively flat frequency response can be achieved. This is because the more variable amplitude response generally associated with resonant or near resonant operational frequencies are generally avoided. The tradeoff for operating the device in this frequency range, well away from the resonant frequency, is efficiency. In general, designing the actuator in the manner herein described will typically result in an actuator that has a physical size that is much smaller than conventional actuator designs.

Figure 6:
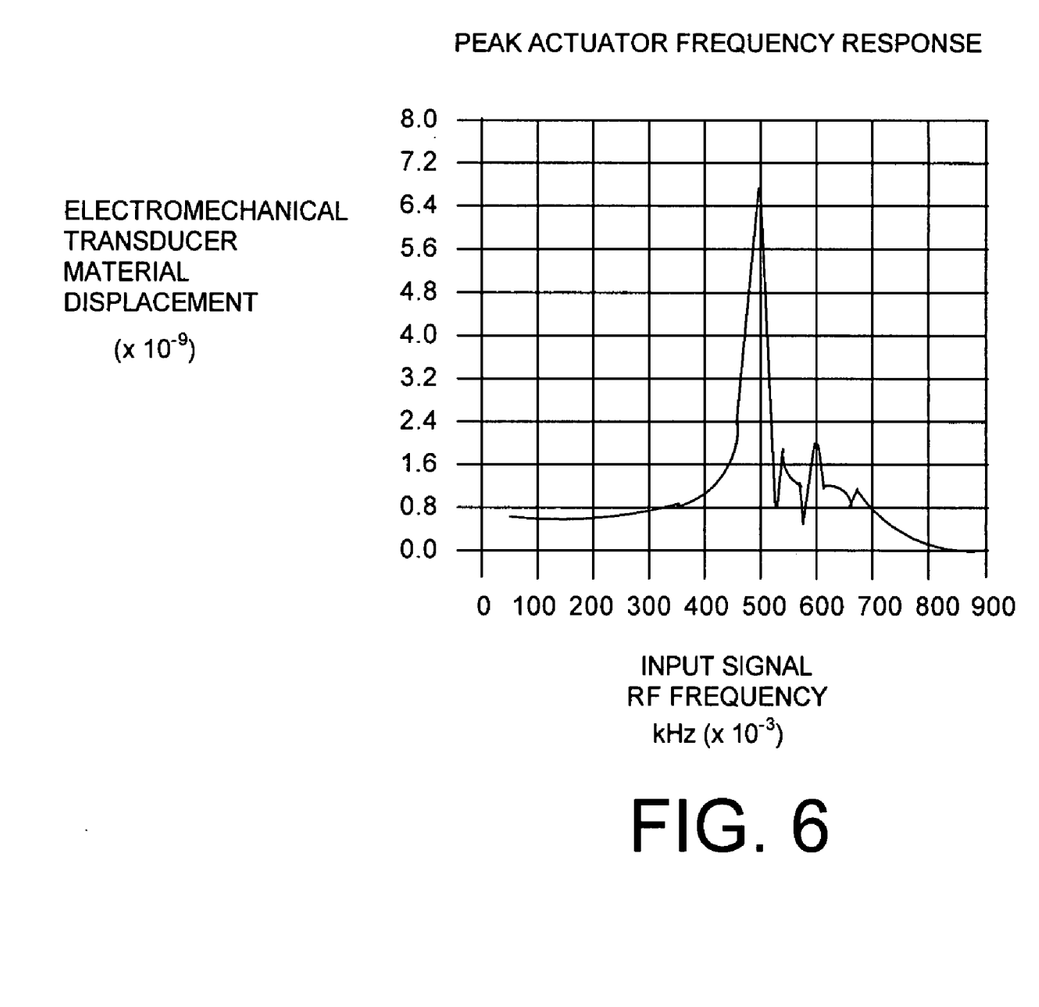
FIG. 6 is a graph showing a peak actuator response that is useful for understanding the invention.

Referring now to FIG. 6, a graph is provided showing a peak actuator 106 response that is useful for understanding the invention. This graph plots an electromechanical transducer material's displacement versus an applied signal's radio frequency. As illustrated by FIG. 6, the transducer material's displacement greatly increases when an applied signal's radio frequency is varied from 400 kHz to 500 kHz (with the drive amplitude held constant), which is the mechanical resonant frequency of the particular actuator device. In some instances, it can be desirable to design an actuator to have a mechanical resonant frequency that is approximately the same as the designed operating frequency of the device. For example, this can be useful in those situations where the actuator does not need to operate over a wide band of signals, and therefore does not require a flat response of material displacement versus frequency. Operating the actuator at the resonant frequency advantageously increases the operating efficiency of the actuator device because a lower magnitude input signal can be used to achieve a particular mechanical response.

It will be appreciated from the foregoing description that the present invention is a significant departure from conventional actuators used for exciting flexural waves on optical fibers. Conventional systems tend to use actuators and horns that are physically large. The size of these components results in the presence of numerous mechanical resonant frequencies for the actuator and horn that can appear within operating bands over which the actuator is designed to operate. The operating frequencies generally correspond to a range of frequencies for flexural waves that are useful in particular optics applications. However, these resonant frequencies associated with the actuator result in erratic and widely varying actuator responses that are undesirable in actuator devices that are intended to operate over a relatively wide frequency band. The large size of the actuator and horns used in conventional devices has also limited the commercial acceptance of such devices. By designing the actuator so that the actuator's 106 resonant frequencies are well away from the operating bands over which the device is designed to operate, the erratic and widely varying response can be avoided and the overall size of the device can be substantially reduced.

The absence of a horn in the present invention has other advantages in addition to those already described. The elimination of the horn means that the fiber can be directly bonded to the actuator. This significantly simplifies the fabrication process and allows for device packaging to be reduced in size.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A system for exciting flexural waves on an optical fiber, comprising:
    a substrate;
    an actuator mounted on said substrate, said actuator formed of an electromechanical transducer material;
    a mechanical optical fiber coupling exclusive of an elongated member and forming a secure mechanical connection between said actuator and said optical fiber, said mechanical optical fiber coupling configured for communicating mechanical vibrations from said actuator to said optical fiber; and
    wherein said actuator has a size and geometry which result in a mechanical resonant frequency of said actuator that is exclusive of a predetermined range of frequencies corresponding to said flexural waves said system is designed to excite.

2. The system according to claim 1, wherein at least one mechanical resonant frequency of said actuator is at least one octave different in frequency than said predetermined range of frequencies of said flexural waves.

3. The system according to claim 1, wherein said mechanical optical fiber coupling is an adhesive media.

4. The system according to claim 1, wherein said actuator has a first end face and a second end face opposing said first end face, and wherein said first end face is secured to said substrate and said second end face is secured to said optical fiber.

5. The system according to claim 4, further comprising at least one electrical conductor forming an electrical connection with each of said first and second end faces.

6. The system according to claim 1, wherein said mechanical optical fiber coupling forms said mechanical connection between said actuator and a plurality of said optical fibers.

7. The system according to claim 1, wherein said electromechanical transducer material is selected from the group consisting of a piezoelectric material, an electrostrictive material, and a magnetostrictive material.

8. The system according to claim 1, further comprising a bonding medium disposed between said actuator and said substrate.

9. The system according to claim 8, wherein said bonding medium is solder.

10. The system according to claim 8, wherein said bonding medium is an adhesive material.

11. The system according to claim 10, wherein said adhesive material is an electrically conductive adhesive material.

12. The system according to claim 10, wherein said adhesive material is an energy absorbing material configured for isolating said substrate from a vibration produced by said actuator.

13. The system according to claim 10, wherein said adhesive material is an energy reflecting material configured for reflecting an acoustic energy away from said substrate.

14. The system according to claim 1, further comprising a damping material disposed on said substrate around a periphery of said actuator.

15. The system according to claim 1, further comprising a damping material incorporated into at least a portion of said substrate or embedded within at least a portion of said substrate.

16. A method for exciting flexural waves on an optical fiber, comprising:
    generating a mechanical vibration with an actuator mounted on a substrate by exciting an electromechanical transducer material forming the actuator;
    forming a flexural wave on said optical fiber by communicating said mechanical vibration to said optical fiber through a mechanical optical fiber coupling exclusive of an elongated member; and
    selecting a size and geometry for said actuator to provide a mechanical resonant frequency of said actuator that is exclusive of a predetermined range of frequencies corresponding to said flexural waves said system is designed to excite.

17. The method according to claim 16, further comprising selecting at least one mechanical resonant frequency of said actuator to be at least one octave different in frequency than said predetermined range of frequencies of said flexural waves.

18. A method for exciting flexural waves on an optical fiber, comprising:
    generating a mechanical vibration with an actuator mounted on a substrate by exciting an electromechanical transducer material forming the actuator;
    forming a flexural wave on said optical fiber by communicating said mechanical vibration to said optical fiber through a mechanical optical fiber coupling exclusive of an elongated member; and
    selecting a size and geometry for said actuator to provide a mechanical resonant frequency of said actuator equal to a predetermined frequency of said flexural waves said system is designed to excite.

19. The method according to claim 16, further comprising selecting said mechanical optical fiber coupling to include an adhesive media.

20. The method according to claim 16, further comprising securing a first end face of said actuator to said substrate and securing an opposing second end face of said actuator to said optical fiber.

21. The method according to claim 20, further comprising forming an electrical connection with each of said first and second end faces.

22. The method according to claim 16, further comprising communicating said mechanical vibration to a plurality of said optical fibers.

23. The method according to claim 16, further comprising selecting said electromechanical transducer material from the group consisting of a piezoelectric material, an electrostrictive material, and a magnetostrictive material.

24. The method according to claim 16, further comprising forming said mechanical optical fiber coupling from an adhesive material.

25. The method according to claim 24, further comprising disposing said adhesive material between said actuator and said optical fiber.

26. The method according to claim 16, further comprising disposing a bonding medium between said actuator and said substrate.

27. The method according to claim 26, further comprising selecting said bonding medium to be an adhesive material.

28. The method according to claim 27, further comprising selecting said adhesive material to be an electrically conductive adhesive.

29. The method according to claim 27, further comprising selecting said adhesive material to be an energy absorbing material for isolating said substrate from a vibration produced by said actuator.

30. The method according to claim 27, further comprising selecting said adhesive material to be an energy reflecting material that has a poor impedance match with said actuator.

31. The method according to claim 16, further comprising positioning a damping material on said substrate around a periphery of said actuator.

32. The method according to claim 16, further comprising incorporating a damping material into at least a portion of said substrate.

33. The method according to claim 16, further comprising embedding at least a portion of said substrate within a damping material.

* * * * *